(12) United States Patent
Nagarajan et al.

(10) Patent No.: US 10,270,604 B2
(45) Date of Patent: Apr. 23, 2019

(54) PIM JOIN ENTROPY

(71) Applicant: Juniper Networks, Inc., Sunnyvale, CA (US)

(72) Inventors: Vikram Nagarajan, Bangalore (IN); Robert W. Kebler, Newburyport, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/636,484

(22) Filed: Jun. 28, 2017

(65) Prior Publication Data

US 2019/0007225 A1 Jan. 3, 2019

(51) Int. Cl.
*H04L 12/18* (2006.01)
*H04L 12/24* (2006.01)
*H04L 12/781* (2013.01)

(52) U.S. Cl.
CPC ........ *H04L 12/185* (2013.01); *H04L 41/0213* (2013.01); *H04L 45/52* (2013.01)

(58) Field of Classification Search
CPC .... H04L 12/185; H04L 41/0213; H04L 45/52
See application file for complete search history.

(56) References Cited

U.S. PATENT DOCUMENTS

2006/0159091 A1* 7/2006 Boers ...................... H04L 45/00
370/390
2016/0147693 A1* 5/2016 Stewart ................. H04L 49/103
710/313
2016/0192233 A1 6/2016 Sarker et al.
2017/0195167 A1* 7/2017 Shibata ................. H04L 49/555

OTHER PUBLICATIONS

Karen et al., "Multicast only Fast Re-Route—draft-ietf-rtgwg-mofrr-04," Internet-Draft, Network Working Group, May 14, 2014, 14 pp.
Thaler et al., "Multipath Issues in Unicast and Multicast Next-Hop Selection," RFC 2991, Network Working Group, Nov. 2000, 9 pp.
Adams et al., "Protocol Independent Multicast—Dense Mode (PIM-DM) : Protocol Specification (Revised)," RFC 3973, Network Working Group, Jan. 2005, 61 pp.
Fenner et al., "Protocol Independent Multicast—Sparse Mode (PIM-SM) : Protocol Specification (Revised)," RFC 4601, Network Working Group, Aug. 2006, 112 pp.
Holbrook et al., "Source-Specific Multicast for IP," RFC 4607, Network Working Group, Aug. 2006, 19 pp.

(Continued)

*Primary Examiner* — Benjamin H Elliott, IV
(74) *Attorney, Agent, or Firm* — Shumaker & Sieffert, P.A.

(57) ABSTRACT

Techniques are described for grouping related flows using a flow attribute value indicated by a modified protocol independent multicast (PIM) join request. According to techniques of this disclosure, a network device is configured to receive, from a downstream network device, two or more first PIM join requests indicating two or more multicast groups. In response to determining that each first PIM join request of the two or more first PIM join requests indicates a common first flow attribute value, the network device is configured to select a common path. The network device is further configured to send two or more second PIM join requests indicating the two or more multicast groups to an upstream network device along the selected common path and toward the source. Each second PIM join request of the two or more second PIM join requests includes a common second flow attribute value.

22 Claims, 7 Drawing Sheets

(56) References Cited

OTHER PUBLICATIONS

Handley et al., "Bidirectional Protocol Independent Multicast (BIDIR-PIM)," RFC 5015, Network Working Group, Oct. 2007, 43 pp.
Boers et al., "The Protocol Independent Multicast (PIM) Join Attribute Format," RFC 5384, Network Working Group, Nov. 2008, 10 pp.
Rajahalme et al., "IPv6 Flow Label Specification," RFC 3697, Network Working Group, Mar. 2004, 10 pp.
Faucheur et al., "Multicast Control Extensions for the Access Node Control Protocol (ANCP)," RFC 7256, Internet Engineering Task Force (IETF), Jul. 2014, 99 pp.
Karan et al., "Multicast only Fast Re-Route, draft-ietf-rtgwg-mofrr-08," Internet Draft, Network Working Group, May 18, 2015, 14 pp.
Extended Search Report from counterpart European Application No. 18174996.1, dated Nov. 20, 2018, 15 pp.
Fenner et al., "Protocol Independent Multicast—Sparse Mode (PIM-SM): Protocol Specification (Revised)," RFC 4601, Aug. 2006, 150 pp.

* cited by examiner

PIM JOIN ENTROPY

TECHNICAL FIELD

The invention relates to computer networks and, more particularly, to a distribution of multicast traffic over computer networks.

BACKGROUND

A computer network is a collection of interconnected computing devices that exchange data and share resources. In a packet-based network the computing devices communicate data by dividing the data into small blocks called packets. Certain devices within the network, such as routers and switches, maintain routing and/or forwarding information that describe paths through the network. In this way, the packets may be individually transmitted across the network from a source device to a destination device. The destination device extracts the data from the packets and assembles the data into its original form. Dividing the data into packets enables the source device to resend only those individual packets that may be lost during transmission.

Examples of computer networks include enterprise networks, branch networks, service provider networks, home networks, virtual private networks (VPNs), local area network (LANs), virtual LANs (VLANs) and the like. In any case, the computer networks may enable remotely located sources and receivers to share data. In some cases, the computer network may be configured to support multicast traffic, such as Internet Protocol Television (IPTV), desktop conferences, corporate broadcasts, music and video web casts, and other forms of multimedia content. For example, the computer network may utilize protocol independent multicast (PIM) as a multicast routing protocol to build distribution trees through the computer network for the transmission of multicast traffic from sources to receivers or subscriber devices for particular multicast groups. PIM may operate in several different modes, including Dense Mode (DM), Sparse Mode (SM) in Source-Specific Multicast (SSM) mode or Any Source Multicast (ASM) mode, and Bidirectional (BIDIR) mode.

SUMMARY

In general, this disclosure describes enhancements to Protocol Independent Multicast (PIM) to support a grouping of related network traffic flows. Such a grouping of related network traffic flows may be used, for example, by a network device configured for multicast only fast re-route (MoFRR). For example, the network device may monitor network traffic for a grouping of related network traffic flows and determine whether to re-route the network traffic for the entire grouping to a backup path.

This disclosure describes a PIM join attribute of a PIM join request message that carries an "entropy" field, also referred to herein as a flow attribute value, that is used to identify a grouping of related network multicast flows. According to techniques of this disclosure, network devices are configured to use the flow attribute value of the PIM join attribute to indicate that multicast flows having the same flow attribute value take the same path to the given source and are grouped in the same "bucket." In this way, rather than determining statistics for each individual flow of network traffic, network devices may determine statistics for the grouping of flows in the same bucket, and perform a fast failover for all flows of the grouping of flows when the flows do not meet certain health criteria.

In one example, this disclosure is directed to a method including receiving, by a network device and from a downstream network device, two or more first PIM join requests indicating two or more multicast groups. In response to determining that each first PIM join request of the two or more first PIM join requests indicates a common first flow attribute value, the method includes selecting, by the network device, a common path toward a source of the two or more multicast groups. The method further includes sending, by the network device, two or more second PIM join requests indicating the two or more multicast groups to an upstream network device along the common path and toward the source. Each second PIM join request of the two or more second PIM join requests includes a common second flow attribute value.

In another example, this disclosure is directed to a network device comprising a routing engine, the routing engine being configured to receive, from a downstream network device, two or more first PIM join requests indicating two or more multicast groups. In response to determining that each first PIM join request of the two or more first PIM join requests indicates a common first flow attribute value, the network device is configured to select a common path toward a source of the two or more multicast groups. The network device is further configured to send two or more second PIM join requests indicating the two or more multicast groups to an upstream network device along the common path and toward the source. Each second PIM join request of the two or more second PIM join requests includes a common second flow attribute value.

In a further example, this disclosure is directed to a computer-readable storage medium comprises instructions for causing a programmable processor to receive, from a downstream network device, two or more first PIM join requests indicating two or more multicast groups. In response to determining that each first PIM join request of the two or more first join requests indicates a common first flow attribute value, the instructions further cause the programmable processor to select a common path toward a source of the two or more multicast groups. The instructions further cause the programmable processor to send two or more second PIM join requests indicating the two or more multicast groups to an upstream network device along the common path and toward the source. Each second PIM join request of the two or more second PIM join requests includes a common second flow attribute value.

In an additional example, this disclosure is directed to a method including receiving, by a network device and from one or more receivers, a request to subscribe to two or more multicast groups. In response to determining that each multicast group of the two or more multicast groups corresponds to a common source, the method includes generating, by the network device, a common flow attribute value. The method further includes sending, by the network device, two or more PIM join requests indicating the two or more multicast groups to an upstream network device along a common path toward the common source. Each PIM join request of the two or more PIM join requests includes the common flow attribute value.

In another example, this disclosure is directed to a network device including a routing engine, the routing engine being configured to receive, from one or more receivers, a request to subscribe to two or more multicast groups. In response to determining that each multicast group of the two or more multicast groups corresponds to a common source, the routing engine is configured to generate a common flow attribute value. The routing engine is further configured to send two or more PIM join requests indicating the two or more multicast groups to an upstream network device along a common path toward the common source. Each PIM join request of the two or more PIM join requests includes a common flow attribute value.

In a further example, this disclosure is directed to a computer-readable storage medium comprises instructions for causing a programmable processor to receive, from one or more receivers, a request to subscribe to two or more multicast groups. In response to determining that each multicast group of the two or more multicast groups corresponds to a common source, the instructions further cause the programmable processor to generate a common flow attribute value. The instructions further cause the programmable processor to send two or more PLM join requests indicating the two or more multicast groups to an upstream network device along a common path toward the common source. Each PIM join request of the two or more PIM join requests includes a common flow attribute value.

The details of one or more examples of the invention are set forth in the accompanying drawings and the description below. Other features, objects, and advantages of the invention will be apparent from the description and drawings, and from the claims.

DETAILED DESCRIPTION

Figure 1A:
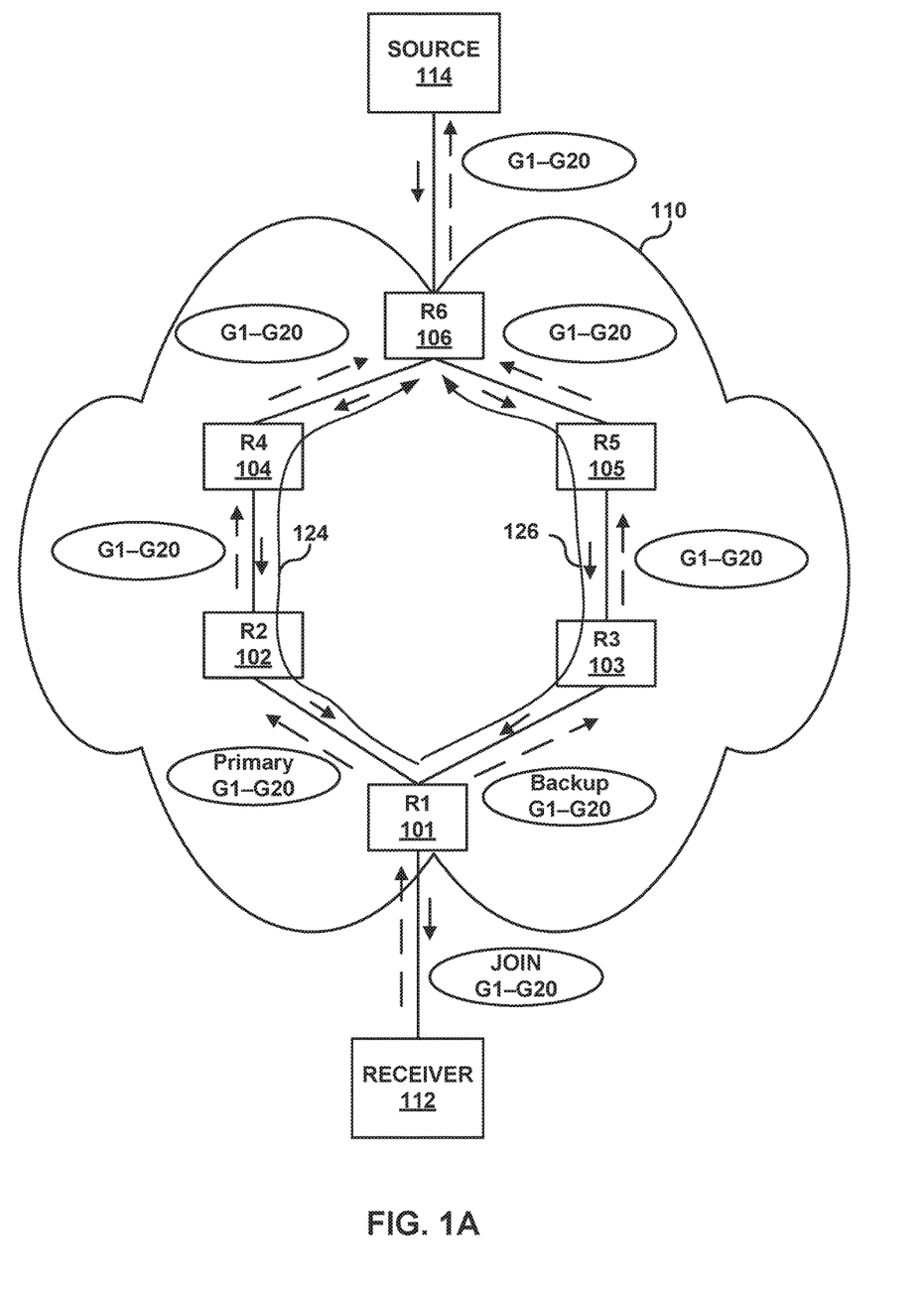
FIGS. 1A-1C are block diagrams illustrating an example computer network including network devices configured to group related multicast flows between a source and a receiver using flow attribute values, in accordance with techniques of this disclosure.
Figure 1B:
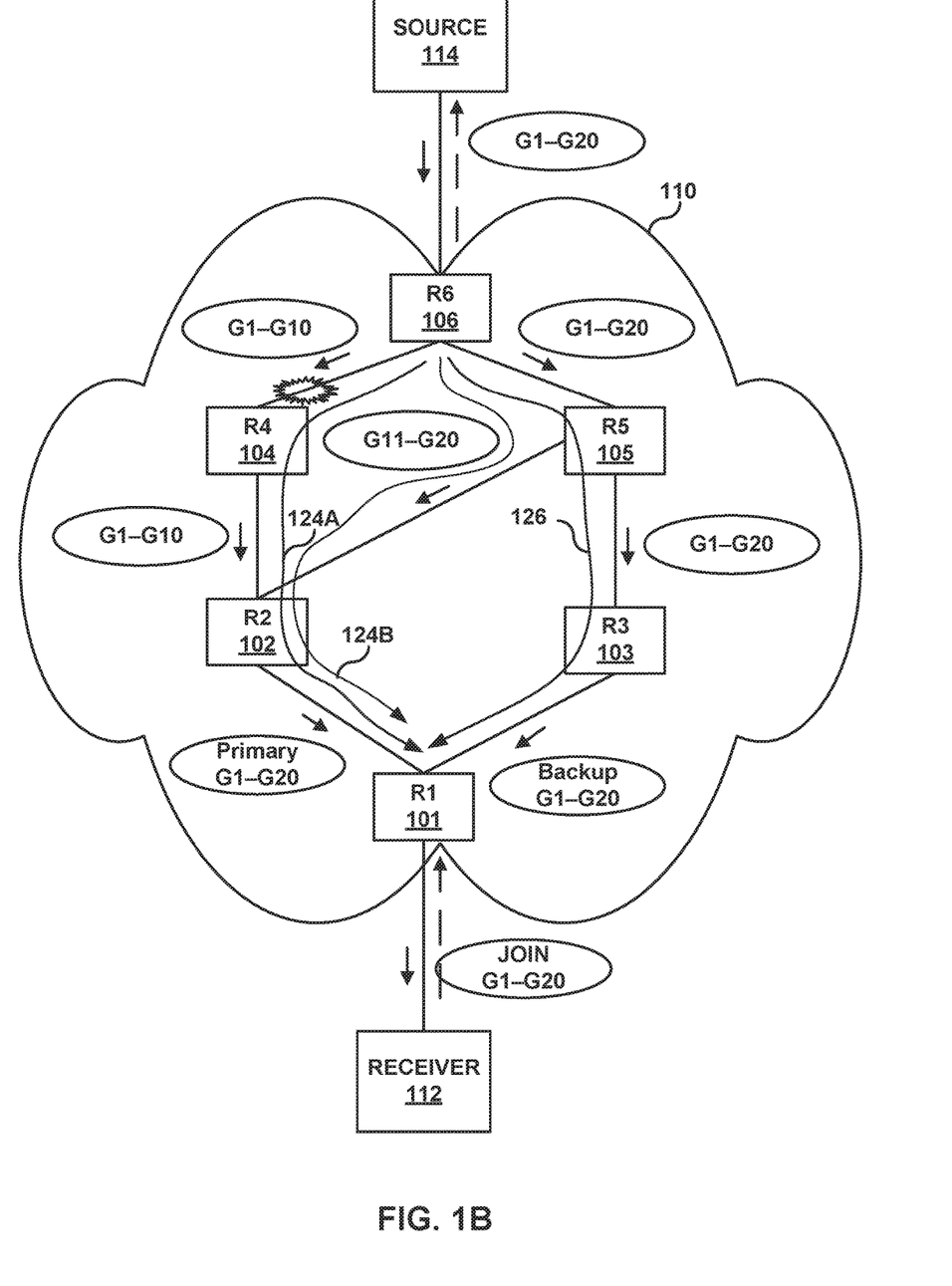
Figure 1C:
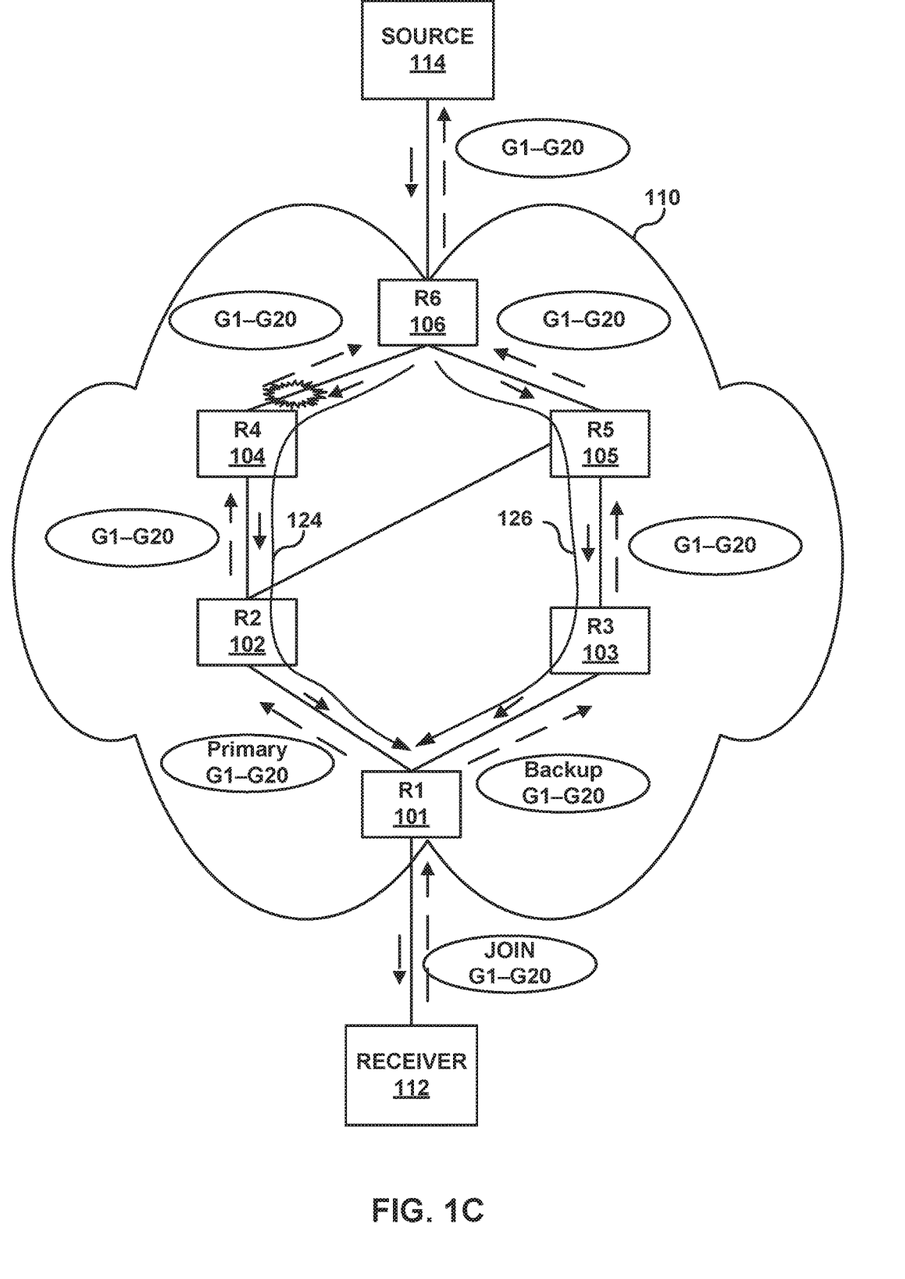

FIGS. 1A-1C are block diagrams illustrating an example computer network including network devices configured to group related multicast flows between a source and a receiver using flow attribute values, in accordance with techniques of this disclosure.

FIG. 1A is a block diagram illustrating an example computer network 110 including network devices configured to transmit multicast traffic between a source 114 and a receiver 112. Network 110 may comprise a private network or a public network, such as the Internet. For example, network 110 may be an enterprise network, a campus network, a service provider network, a home network, a local area network (LAN), a virtual local area network (VAN), virtual private network (VPN), or another autonomous system. In any of these examples, remotely located source 114 and receiver 112 may share data via network 110.

In an example of network 110 as an enterprise network, each of source 114 and receiver 112 may comprise one or more servers or employee computer terminals located in different regions of a single office location, or may comprise a remote office location of a corporation.

In the illustrated example, network 110 comprises an Internet Protocol (IP) network including network devices that use a Protocol Independent Multicast (PLM) protocol to route multicast traffic through network 110 between source 114 and receiver 112 for particular multicast groups. The PIM protocol may operate in several different modes, including Dense Mode (DM), Sparse Mode (SM) in Source-Specific Multicast (SSM) mode or Any Source Multicast (ASM) mode, and Bidirectional (BIDIR) mode. Additional information regarding PIM protocols may be found in Adams, A., et al., "Protocol independent Multicast Version 2-Dense Mode Specification," RFC 3973, 2005; Fenner, B., et al., "Protocol Independent Multicast-Sparse Mode (PIM-SM): Protocol Specification (Revised)," RFC 4601, 2006; Holbrook. H. and B. Cain, "Source-Specific Multicast for IP," IETF RFC 4607, 2006; and Handley, M., et al., "Bidirectional Protocol Independent Multicast (BIDIRPIM)," IETF RFC 5015, 2007, the entire contents of each of which are incorporated by reference herein.

Network 110 includes a plurality of network devices, including routers (R1-R6) 101-106. In a typical network topology that utilizes the PIM protocol, additional network devices may be included, for example, additional routers, a router designated as a rendezvous point (RP), and other network devices. For purposes of illustration, these additional network devices are not shown in FIG. 1A.

Each of source 114 and receiver 112 may be included in a remote site (not shown) that may be a local area network (LAN) or a wide area network (WAN) comprising a plurality of subscriber devices, such as desktop computers, laptops, workstations, PDAs, wireless devices, network-ready appliances, file servers, print servers or other devices. The remote sites may be configured to support multicast traffic, such as Internet Protocol Television (IPTV), desktop conferences, corporate broadcasts, music and video web casts, and other forms of multimedia content.

In the example illustrated in FIG. 1A, source 114 may provide traffic for one or more multicast groups, and receiver 112 may request or subscribe to traffic from one or more multicast groups. In other examples, network devices within network 110 may be connected to more than one source and/or more than one receiver.

As an example, when receiver 112 is interested in receiving multicast traffic for a given multicast group, receiver 112 may send a request to join the multicast group to router 101 in network 110. Upon receiving the request from receiver 112, router 101 initiates establishment of a multicast distribution tree for the given multicast group. If router 101 is aware of the source of the multicast group, e.g., source 114, router 101 may initiate establishment of a source tree toward source 114 using a (S,G) PIM control message that includes a join request for the source (S) and the multicast group (G). If router 101 is not aware of the source of the multicast group, router 101 may first initiate establishment of a shared tree toward a router designated as a rendezvous point (not shown) by using a (*,G) PIM control message that includes a join request for any source (*) and the multicast group (G). Once router 101 learns the source of the multicast group, router 101 may subsequently initiate establishment of a source tree directly toward source 114, which may be a shortest path tree (SPT), and may tear down the shared tree toward the router designated as the rendezvous point.

Regardless of which type of multicast distribution tree is established in network 110 for receiver 112 to receive multicast traffic from source 114, it may be desirable for one or more of the network devices of the multicast distribution tree to support multicast only fast re-route (MoFRR) to provide protection for one or more links or nodes along a primary path of the multicast distribution tree. The example of FIG. 1A illustrates a source tree established between router 101 and router 106 in network 110 in which the source tree includes a primary path 124 and a backup path 126. Primary path 124 includes a multi-hop path to router 106 that includes routers 102 and 104, and backup path 126 includes a multi-hop path to router 106 that includes routers 103 and 105. Backup path 126, therefore, provides protection for the multi-hop path between router 101 and router 102 along primary path 124.

In FIG. 1A, the dashed arrows indicate PIM control messages (i.e., PIM join request and/or PIM prune messages) sent towards source 114 to build the multicast distribution tree, and the solid arrows indicate multicast traffic being forwarded over the multicast distribution tree towards receiver 112. In the illustrated example, router 101 may provide MoFRR. For example, router 101 may be configured with MoFRR such that router 101 calculates primary path 124 toward source 114, and also calculates backup path 126 toward source 114. When router 101 has 20 multicast groups (e.g., multicast groups G1-G20), router 101 may send PIM join requests for the 20 multicast groups to router 102 and may send PIM join requests for the 20 multicast groups to router 103. More specifically, for example, when router 101 receives a request to subscribe to multicast groups G1-G20 from receiver 112, router 101 selects router 102 as its primary next hop towards source 114 and sends a PIM control message to router 102 along primary path 124. In accordance with MoFRR, router 101 may further select router 103 as its backup next hop towards source 114 and sends a PLM control message to router 103 along backup path 126.

Upon establishment of the two paths, router 101 may receive multicast data packets from source 114 over both primary path 124 and backup path 126. Router 101 may be configured to forward the multicast data packets received over primary path 124, and to perform a switchover to backup path 126 in the case of a failure in primary path 124. Additional information regarding MoFRR may be found in MDI Karan, A., et al., "Multicast only Fast Re-Route," draft-ietf-rtgwg-mofrr-04, IETF Internet-Draft, Network Working Group, May 14, 2014 (hereinafter referred to as "draft-karan,"), the contents of which are incorporated herein by reference.

In some applications, such as, for instance, but not limited to, multicast liven live, an egress router (e.g., router 101) may monitor network traffic of each flow individually and on two different interfaces. For example, router 101 may monitor the health of the primary flows using a traffic-rate, media delivery index (MDI) value, or another technique to monitor the health of the primary flows. More specifically, for example, an egress router may determine whether the monitored traffic of each flow is healthy. Traffic health is a factor of traffic delay, jitter, drop rate, and the like. Traffic health may be used to determine if an upstream failure has occurred on a path. For example, router 101 may determine whether monitored traffic of each flow from router 102 along primary path 124 is healthy using an incoming traffic-rate. Additionally, or alternatively, router 101 may determine whether monitored traffic of each flow from router 102 along primary path 124 is healthy using advanced metrics (media delivery index (MDI) value, etc.). In response to determining that the monitored traffic of a particular flow is healthy, router 101 may forward the network traffic received for the particular flow from router 102 along primary path 124 to receiver 112. In response to determining that the monitored traffic of a particular flow is not healthy, router 101 may perform fast re-route and instead forward the network traffic for the particular flow received from router 103 along backup path 126 to receiver 112.

Tracking each flow's statistics in real time to measure the health of each flow may be tedious and may cause scaling problems if the number of flows are in the order of thousands. More specifically, for example, when there are many multicast flows (e.g., more than one hundred, more than a thousand, etc.), router 101 may not have sufficient computing resources to monitor each flow individually. It should be understood that in some applications, such as, but not limited to, IPTV, monitoring each flow individually may he unnecessary when flows take the same path from the source to the egress router. In the example of FIG. 1, router 101 may monitor multicast data for multicast groups G1-G20 that is received along primary path 124 from source 114. In this example, router 101 may not need to individually monitor each flow for respective multicast data for multicast groups G1-G20 because a flow for each multicast group (e.g., G1-G20) takes the same path (e.g., primary path 124) from the source 114 to router 101.

As such, it would be beneficial to accumulate statistics for a grouping of flows and configure router 101 to perform a fast failover for all flows for multicast groups G1-G20 when the flows do not meet a certain health criteria. For example, router 101 may group all the flows that come in on the same incoming interface. In some examples, router 101 may group all the flows with a same source address. For example, router 101 may group all the flows with a same source address for source 114. It makes sense to group these flows in the same bucket if the flows can all take the same path from the source to this receiver. Using one or more techniques described herein, rather than flows for different multicast groups having different paths to a common source, router 101 may cause flows for different multicast groups to take a common path to the common source. In this way, rather than individually monitoring and performing a fast failover for each respective flow for multicast groups G1-G20, router 101 may monitor and perform a fast failover for all flows for multicast groups G1-G20.

In the example of FIG. 1A, router 101 performs a grouping of all flows for multicast groups G1-G20 into a bucket and monitors the cumulative health of the bucket rather than a health of each flow for multicast groups G1-G20. In this example, router 101 monitors traffic statistics of multicast groups G1-G20 as "bucket-1." In this example, router 101 may monitor bucket-1's health alone. For example, router 101 may take an initial signature of bucket-1's traffic rate and periodically check bucket-1's health against this signature. In this way, statistics collection and comparison of multicast groups G1-G20 may be simplified compared to techniques that monitor a health of each flow individually. On detecting failure in bucket-1, router 101 may switchover multicast groups G1-G20 to forward network traffic from backup path 126.

FIG. 1B is a block diagram illustrating another example of computer network 110 in which there is a link between router 102 and router 105. In the illustrated example, it cannot be assumed that the paths of the primary and the backup are disjoint. For example, each one of routers 102-105 may select a next-hop for a flow for a respective multicast group of multicast groups G1-G20 independently from a next-hop for a flow from another multicast group of multicast groups G1-G20. For instance, routers 102-105 may individually select a next-hop for a multicast group of multicast groups G1-G20 using equal-cost multi-path (ECMP) links. For example, router 102 may select router 104 as an upstream next-hop towards source 114 for multicast groups G1-G10, and select router 105 as an upstream next-hop toward source 114 for multicast groups G11-G20. As another example, router 102, router 103, router 104, and router 105 may be included in a multicast virtual private network (MVPN) or a local area network (LAN) such that each of the routers advertises received multicast group join requests to all adjacent routers in the MVPN or LAN. In either example, router 102 distributes the join messages received from router 101 to both router 104 and router 105, and establish multiple primary paths 124A and 124B. If this happens, the bucketing or grouping of multicast flows by router 101 for purposes of monitoring traffic health and performing MoFRR, as described above with respect to FIG. 1A, may not work nicely. One reason is discussed in further detail below.

In the example of FIG. 1B, router 102 may select between two ECMP links toward source 114 for forwarding PIM join request messages for different multicast groups. In this example, router 102 may select router 104 as a next-hop along primary path 124A for multicast groups G1-G10 and select router 105 as a next-hop along primary path 124B for multicast groups G11-G20. As such, in the example of FIG. 1B, when a fault occurs on a link between routers 104 and 106, network traffic for multicast groups G1-G10 may be dropped along path 124A and thus not considered to be healthy while the network traffic for multicast groups G11-G20 continues to flow along path 124B and remains healthy. Router 101, therefore, will continue to receive network traffic for multicast groups G11-G20 on primary path 124B.

In the example of FIG. 1B, although router 101 is no longer receiving the network traffic for multicast groups G1-G10 along path 124A due to the upstream fault, router 101 may determine that a cumulative rate of network traffic for multicast groups G1-G20 has not gone down (i.e., is still healthy) because router 101 continues to receive network traffic for multicast groups G11-G20 over path 124B. Accordingly, in the example of FIG. 1B, router 101 may not be able to determine when to perform a fast failover for a portion of the traffic flows for the multicast groups G1-G20 included in a bucket or grouping. In the above example, router 101 may not have adequate path knowledge to properly group flows for multicast groups G1-G20.

According to the techniques of this disclosure, router 102 is configured to determine that multicast groups G1-G20 are grouped into the same bucket, and send the PIM join requests for all the groups in the same bucket over the same path towards source 114. For example, upon determining that multicast groups G1-G20 are in bucket-1, router 102 sends the PIM join requests for all the groups G1-G20 toward router 104 over path 124A. This will ensure that all the flows in the same bucket travel over the same path. Any failure in the path will be detected by router 101 by measuring the cumulative rate of the flows over the common path and router 101 may make a quick informed decision to switchover all the flows in the bucket to the backup path. An example of this is to group all the flows received on the same incoming interface. Another example is to group all the flows with the same source address. In this example, multicast groups G1-G20 could be from the same source (e.g., source 114) while other flows on router 101 may be from a different source.

In one example, router 102 may determine that multicast groups G1-G20 are included in the same bucket or grouping based on an indication communicated from router 101 along with the PIM join requests. Based on the indication that the groups G1-G20 are in the same bucket, router 102 sends PIM join messages for the multicast groups G1-G20 towards source 114 along a common path (e.g., to router 104). It should be understood that the indication that the groups are in the same bucket may not be used by only router 102. Instead, any router further should also treat the groups in the bucket in the same manner as described regarding router 102 so that all the routers in the path will ensure that the groups in the bucket reside on the same path.

The indication of the bucketing or grouping of multicast groups may be communicated between routers using a new signaling process described herein that permits a downstream router (e.g., router 101) to identify which PIM join requests (also referred to as "(S,G)s") should take a common path toward the source, especially in the case where an ECMP set of paths exists between the downstream router and the source.

For example, router 101, after it groups the flows in bucket-1, sends PIM join requests with a Join-attribute-TLV that indicates that a particular group is included in bucket-1. The Join-attribute carries the indication in an entropy field (also referred to herein as a "flow attribute value"). This mechanism may also be applied over a BGP-MVPN cloud by introducing an extended community in the Type-6/7 route to carry the entropy field.

As illustrated in FIG. 1C, when router 102 receives a PIM join request for multicast group G1, router 102 looks for the Join-attribute. In this example, router 102 determines that multicast group G1 is included in bucket-1. As such, router 102 forwards the PIM join request for multicast group G1 along a common upstream path for bucket-1, for example to router 104. When router 102 receives a PIM join request for multicast group G2, router 102 again looks for the Join-attribute. In this example, router 102 determines that the PIM join request for multicast group G2 is also included in bucket-1. As such, router 102 selects the same upstream path to router 104 for multicast group G2 and multicast group G1 when router 101 assigns multicast groups G1 and G2 to the same bucket-1. Such a mechanism will ensure that router 102 will send the multicast groups included in bucket-1 along the same path to the same upstream router. In addition, router 102 will include a Join-attribute-TLV in the PIM join requests to indicated that these flows are to be kept along the same path towards their common source 114. Router 102 may potentially use a different value in the entropy field of its PIM join requests compared to the entropy field of the PIM join requests received from router 101. The entropy value has local significance and is meaningful to the router that originated the PIM join request.

The techniques described herein may be used when there are thousands of flows to the same source but for different groups. This may be common when multicast is used to deliver IPTV. For example, source 114 may act as a single headend source and each multicast group of multicast groups G1-G20 may correspond to a TV channel. The PIM join requests may be split into a set of entropy☐groups. This number of entropy groups could match the number of ECMP links to the source.

This disclosure introduces a PIM join Attribute that carries an entropy field (also referred to herein as a "flow attribute value.") For example, in response to determining that the PIM join requests for two or more multicast groups carry a common flow attribute value and are received from the same downstream router, network devices send the PIM join requests to a common upstream neighbor along one of the ECMP links. In the example of FIG. 1C, router 101 sends, for each multicast group of multicast groups G1-G20, a PIM join request to router 102 along primary path 124 that includes a common flow attribute value. In this example, in response to determining that each PIM join request for multicast groups G20 indicates the common flow attribute value, router 102 selects router 104 as a next-hop for all the PIM join requests for multicast groups G1-G20. In this way, the egress router (e.g. router 101) may ensure that routers select the same path for a given grouping of multicast flows that have a common source such that the flows may be grouped in the same bucket.

In this way, router 102 represents an example of a network device including a routing engine, the routing engine being configured to receive, from a downstream network device, two or more first PIM join requests indicating two or more multicast groups. In response to determining that each first PIM join request of the two or more first PIM join requests indicates a common first flow attribute value, the routing engine configured to select a common path toward a source of the two or more multicast groups and to send two or more second PIM join requests indicating the two or more multicast groups to an upstream network device along the common path and toward the source. Each second PIM join request of the two or more second PIM join requests includes a common second flow attribute value.

Additionally, router 101 represents an example of a network device including a routing engine, the routing engine being configured to receive, from one or more receivers, a request to subscribe to two or more multicast groups. In response to determining that each multicast group of the two or more multicast groups corresponds to a common source, the routing engine is configured generate a common flow attribute value. The routing engine is further configured to send two or more PIM join requests indicating the two or more multicast groups to an upstream network device along a common path toward the common source. Each PIM join request of the two or more PIM join requests includes a common flow attribute value.

Figure 2:
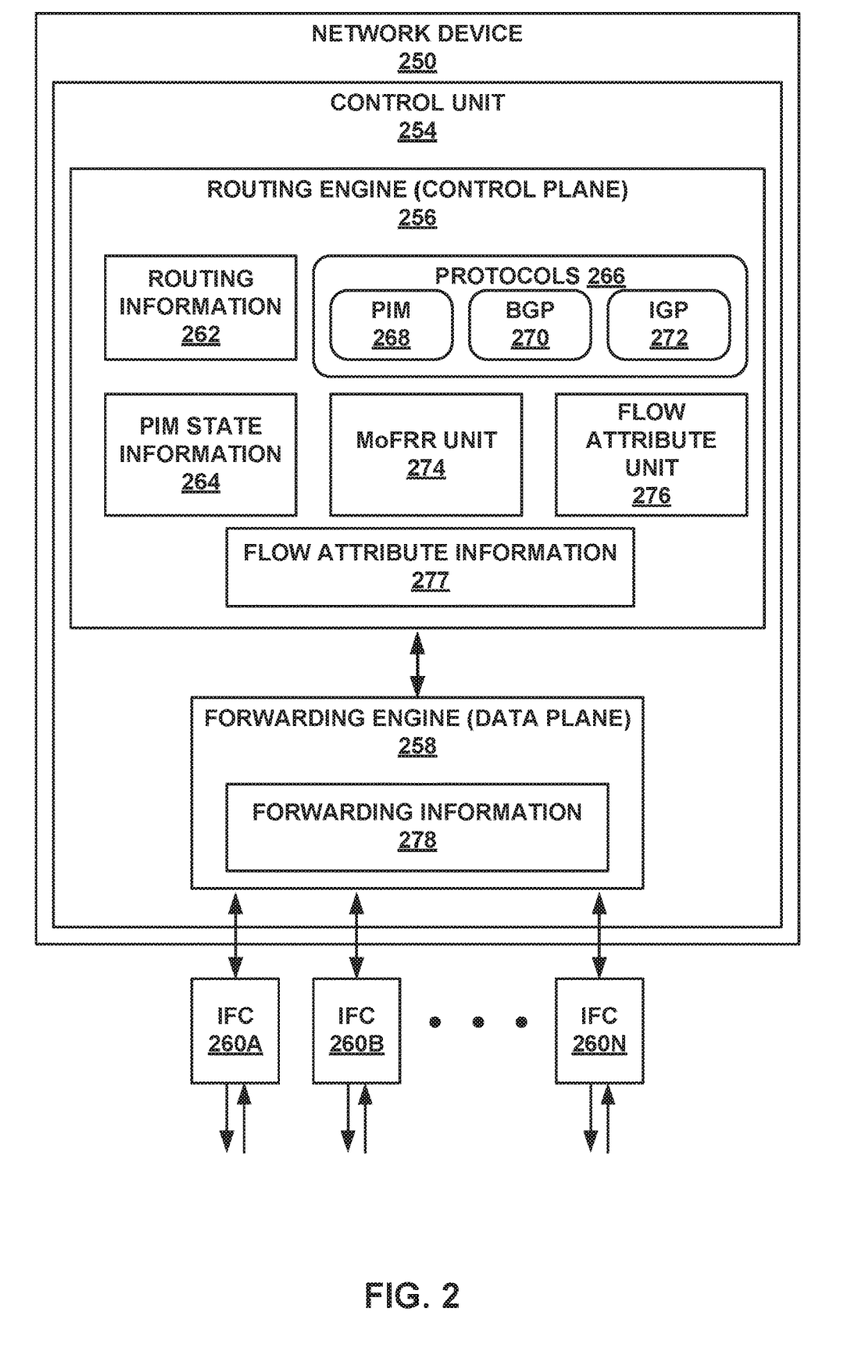
FIG. 2 is a block diagram illustrating an example router configured to use a flow attribute value, in accordance with techniques of this disclosure.

FIG. 2 is a block diagram illustrating an example router configured to use a flow attribute value, in accordance with techniques of this disclosure. In one example, network device 250 may operate as a network device configured to initiate establishment of a primary path and a backup path toward a source device of a multicast group to provide MoFRR over the backup path. Network device 250 may operate as an egress network device along a primary path or backup path. For instance, network device 250 may operate substantially similar to router 101 from FIGS. 1A-1C. In another example, network device 250 may operate as a transit network device along a primary path or backup path. For instance, network device 250 may operate substantially similar to routers 102-106 from FIGS. 1A-1C.

In the illustrated example of FIG. 2, network device 250 includes interface cards 260A-260N ("IFCs 260") that receive multicast control and data packets via incoming links and send multicast packets via outbound links. IFCs 260 are typically coupled to the incoming links and the outbound links via a number of interface ports. Network device 250 also includes a control unit 254 that determines routes of received packets and forwards the packets accordingly via IFCs 260.

Control unit 254 includes a routing engine 256 and a forwarding engine 258. Routing engine 256 operates as the control plane for network device 250 and includes an operating system (not shown) that may provide a multi-tasking operating environment for execution of a number of concurrent processes. For example, routing engine 256 provides an operating environment for various protocols 266 that perform routing functions for network device 250. In the illustrated example of FIG. 2, routing engine 256 includes a border gateway protocol (BGP) 270 and an interior gateway protocol (IGP) 272 as unicast routing protocols used to exchange routing information with other network devices in a network in order to discover the network topology and update routing information 262. In some examples, IGP 272 may be a link-state routing protocol such as open shortest path first (OSPF) or intermediate system-intermedia system (IS-IS). In addition, routing engine 256 includes PIM 268 as a multicast routing protocol used to build multicast distribution trees with the other network devices in the network using routing information 262 and PIM state information 264.

Routing information 262 may describe the topology of the network in which network device 250 resides, and may also describe various routes within the network and the appropriate next hops for each route, i.e., the neighboring network devices along each of the routes. Routing information 262 may include a list of incoming interfaces (IIFs) and a list of outgoing interfaces (OIFs) that indicate which of IFCs 260 are connected to the neighboring network devices in each route. For example, a given route may comprise a multicast route for multicast traffic of a given multicast group. In that example, the list of IIFs included in routing information 262 may include a list of upstream interfaces for all upstream neighbor network devices that have state for the given multicast group, and the list of OIFs included in routing information 262 may include a list of downstream interfaces for all downstream neighbor network devices that have state for the given multicast group.

PIM state information 264 may describe a current status of interfaces for the neighboring network devices in the multicast distribution trees established using PIM 268. For example, PIM state information 264 may include multicast state (e.g., PIM join state and PIM prune state) for each different multicast group within a range for a given multicast distribution tree. More specifically, for each multicast group, PIM state information 264 may include upstream and downstream interfaces toward neighboring network devices that belong to the respective multicast group.

Routing engine 256 analyzes routing information 262 and PIM state information 264 to generate forwarding information 278 installed in forwarding engine 258. Forwarding engine 258 provides data plane functionality for network device 250. Although not shown in FIG. 2, forwarding engine 258 may comprise a central processing unit (CPU), memory and one or more programmable packet-forwarding application-specific integrated circuits (ASICs). Forwarding information 278 associates network destinations with specific next hops and corresponding ports of IFCs 260.

According to the techniques of this disclosure, routing engine 256 of network device 250 may be configured to operate as an egress router. For example, routing engine 256 of network device 250 may be configured to perform MoFRR using PIM 268, MoFRR unit 274, and flow attribute unit 276. More specifically, the disclosed techniques include an enhancement to PIM 268 to ensure that routers select the same path for a given source and that multiple flows may be grouped in the same bucket. That is, rather than a routing engine of upstream routers dividing flows for a grouping of multicast groups that have a common source evenly among multiple ECMP paths, the routing engines of upstream routers may select a single ECMP path for the grouping of multicast groups. Flow attribute unit 276 may generate a common flow attribute value for each multicast group corresponding to a common source. MoFRR unit 274 may control the MoFRR mechanisms performed by network device 250. For example, PIM 268 may calculate a shortest path toward a source of a requested multicast group or a bucket of multicast groups as a primary path, and calculate a backup path toward the source of the requested multicast group or the common source of the bucket of multicast groups as a backup path. In this example, MoFRR unit 274 may define the primary path and the backup path by installing routes in forwarding information 278 with the appropriate designations. In this way, routing engine 256 may ensure that routers upstream from network device 250 select the same primary path and the same backup path for a common source and that multiple flows may be grouped in the same bucket.

To enable signaling of a grouping of multiple flows in the same bucket, flow attribute unit 276 uses enhancements to PIM 268 to generate a PIM join request having a new PIM join attribute to indicate a flow attribute value for the PIM join requests. For example, flow attribute unit 276 may generate a common flow attribute value of '1' when flow attribute unit 276 determines that each multicast group of multicast groups G1-G20 of FIGS. 1A-1C corresponds to a common source (e.g., source 114) and that flow attribute value of '1' is not used for grouping other flows in the same bucket. More specifically, for example, in response to flow attribute unit 276 determine that flow attribute information 277 indicates that flow attribute value of '0' is used to group multicast groups G21-G30 for a particular next-hop router and that flow attribute value of '1' is not used to group multicast groups towards a particular next-hop router, flow attribute unit 276 may modify flow attribute information 277 to indicate that the flow attribute value of '1' is used to group multicast groups G1-G20. In this way, flow attribute unit 276 may be configured to generate a common flow attribute value for a bucket of multicast groups that is unique at least to network device 250.

It should be understood, that in some examples, flow attribute information 277 may only have a local significance. For example, flow attribute values of a flow attribute information of router 101 of FIGS. 1A-1C may be different from flow attribute values of a flow attribute information of router 102 of FIGS. 1A-1C. Further, flow attribute values of flow attribute information 277 may be duplicative for multicast groups that have different next-hop routers.

Routing engine 256 may utilize 268 to generate PIM join requests for a bucket of multicast groups to be sent toward the common source along the primary path that indicate the common flow attribute value generated by flow attribute unit 276. Similarly, routing engine 256 may utilize PIM 268 to generate PIM join requests for a bucket of multicast groups to be sent toward the common source along the backup path that indicate a common flow attribute value generated by flow attribute unit 276.

MoFRR unit 274 may then program a multicast route for the primary path and the backup path into forwarding information 278 in forwarding engine 256. Once the primary path and the backup path are established, multicast traffic will flow over both the paths in a live-live or active-active implementation. Upon receiving the multicast traffic over the primary path and the backup path, forwarding engine 258 of network device 250 forwards the multicast traffic according to the multicast route for the backup path programmed into forwarding information 278.

MoFRR unit 274 may monitor network traffic for the plurality of multicast groups to detect failure on the common path for the plurality of multicast groups. For example, MoFRR unit 274 may monitor network traffic for multicast groups that correspond to the common flow attribute value to detect failure on the common path for the multicast groups. MoFRR unit 274 may determine that failure has occurred on the common path for all of the multicast groups when failure occurs on the common path for network traffic for any multicast group of the plurality of multicast groups. For example, MoFRR unit 274 may determine that failure has occurred on primary path 124 of FIGS. 1A-1C for multicast groups G1-G20 when failure occurs on primary path 124 for network traffic for any one of multicast groups G1, G2, . . . , and G20.

More specifically, MoFRR unit 274 may perform a fast failover for all flows for multicast groups G1-G20 using a cumulative network traffic flow rate. For example, network device 250 may forward, to the one or more receivers, multicast data received along the common primary path in response to determining that a cumulative network traffic flow rate of network traffic for all of the two or more multicast groups over the common primary path satisfies one or more threshold values. For instance, MoFRR unit 274 may forward, to receiver 112 of FIG. 1, multicast data received along primary path 124 in response to determining that a cumulative network traffic flow rate of network traffic for all of multicast groups G1-G20 over primary path 124 satisfies (e.g., is greater than) a minimum network traffic flow rate threshold, an average network traffic flow rate threshold, and a maximum network traffic flow rate threshold.

Similarly, network device 250 may forward, to the one or more receivers, multicast data received along the common backup path in response to determining that the cumulative network traffic flow rate of network traffic for all of the two or more multicast groups over the common primary path does not satisfy the one or more threshold values. For instance, MoFRR unit 274 may forward, to receiver 112 of FIG. 1, multicast data received along backup path 126 in response to determining that a cumulative network traffic flow rate of network traffic for all of multicast groups G1-G20 over primary path 124 does not satisfy (e.g., is less than) a minimum network traffic flow rate threshold, an average network traffic flow rate threshold, and a maximum network traffic flow rate threshold.

Additionally, or alternatively, MoFRR unit 274 may perform a fast failover for all flows for multicast groups G1-G20 using a media delivery index (MDI). For example, MoFRR unit 274 may forward, to the one or more receivers, multicast data received along the common primary path in response to determining that a MDI for all of the two or more multicast groups over the common primary path satisfies one or more threshold values. Examples of MDI threshold values may include, but are not limited to, a time distortion threshold, a packet loss threshold, a packet delay variation threshold, a delay factor, a media loss rate, a combination thereof, or another MDI threshold. For instance, MoFRR unit 274 may forward, to receiver 112 of FIG. 1, multicast data received along primary path 124 in response to determining that a MDI for all of multicast groups G1-G20 over primary path 124 satisfies a delay factor threshold and a media loss rate threshold.

Similarly, MoFRR unit 274 may forward, to the one or more receivers, multicast data received along the common backup path in response to determining that the MDI for all of the two or more multicast groups over the common primary path does not satisfy the one or more threshold values. For instance, MoFRR unit 274 may forward, to receiver 112 of FIG. 1, multicast data received along backup path 126 in response to determining that a MDI for all of multicast groups G1-G20 over primary path 124 does not satisfy a delay factor threshold and a media loss rate threshold.

According to the techniques of this disclosure, routing engine 256 of network device 250 may be configured to operate as a transit router. For example, routing engine 256 of network device 250 may be configured to determine whether PIM join requests from a particular downstream router indicate a common flow attribute value. More specifically, for example, routing engine 256 may be configured to extract a flow attribute value from a PIM join attribute of each PIM join request received from the particular downstream router. In response to determining that each of the flow attribute values extracted from the PIM join attribute of each PIM join request corresponds (e.g., is equal to, is substantially equal to, etc.) to a common flow attribute value, routing engine 256 may be configured to determine that the PIM join requests from the particular downstream router indicate a common flow attribute value.

Routing engine 256 may be configured to select a common path based on the common flow attribute value. For example, routing engine 256 may divide flows for different multicast groups evenly among multiple ECMP paths when the flow attribute values for the different multicast groups are different. In this example, routing engine 256 may select a single ECMP path for a grouping of multicast groups when each PIM join request for the grouping of multicast groups includes a common flow attribute value indicating a single bucket. More specifically, for example, in response to determining that PIM join requests from a particular downstream router indicate the common flow attribute value, routing engine 256 selects a common path for the PIM join requests. In some examples, routing engine 256 may be configured to select the common path by selecting one of a plurality of ECMP links between network device 250 and a source for multicast groups of the PIM join requests. Additional information regarding ECMP may be found in Thaler, D., et al., "Multipath Issues in Unicast and Multicast Next-Hop Selection," RFC 2991, IETF Internet-Draft, Network Working Group, November 2000 (hereinafter referred to as "draft-Thaler,"), the contents of which are incorporated herein by reference.

Routing engine 256 of network device 250 may generate a PIM join request having the same common flow attribute as a received PIM join request. For example, routing engine 256 may extract a common first flow attribute value from each first PIM join request of a set of first PIM join requests for a bucket of multicast groups. In this example, routing engine 256 may generate two or more second PIM join requests each having a common second flown attribute value that corresponds (e.g., is equal to, is substantially equal to, etc.) to the common first flow attribute value extracted from each first PIM join request of the two or more first PIM join requests.

Routing engine 256 may use a different flow attribute value than a flow attribute value received from its downstream neighbor, when it sends a PIM join message to an upstream router. That is, the flow attribute value (e.g., 16☐bit) may not have global significance. The flow attribute value may be simply a way for a neighbor to group a set of sources together by giving the same flow attribute value (e.g., 16☐bit). For example, when routing engine 256 receives the same flow attribute value from two different neighbors, routing engine 256 may not treat the flow attribute value as related in any way. That is, the flow attribute value may have local significance in the context of the router from which it was received.

As such, routing engine 256 of network device 250 may be configured to forward PIM join requests for multicast groups that indicate a common flow attribute value that is different than a common flow attribute value indicated in received PIM join requests for the multicast groups. For example, routing engine 256 may be configured to extract a common first flow attribute value from each first PIM join request of the two or more first PIM join requests for a bucket of multicast groups. In this example, routing engine 256 may be configured to generate two or more second PIM join requests such that the common second flow attribute value included in each second PIM join request of the two or more second PIM join requests is different than the common first flow attribute value extracted from each first PIM join request of the two or more first PIM join requests.

In some examples, routing engine 256 may include a new hello option such that the flow attribute value may be only used with network devices that will understand it. This functionality may be upgraded on all devices along the ECMP links between the receiver and source for fill functionality.

In some examples, a network device that receives a PIM join request indicating (S1,G1) and a join request indicating (S2, G2) with the same flow attribute value may not be able to honor the flow attribute value if there no upstream neighbors in common between source S1 and source S2. However, as long as there is at least one upstream neighbor in common, this router may send a PIM join message to the same neighbor for the join request indicating (S1, G1) and the join request indicating (S2,G2) and with the same flow attribute value.

In some examples, if the entropy join TLV is not included in the join message for a join request indicating (S,G), then the join request indicating (S,G) may be sent on any upstream interface that the router chooses. That is, the existing behavior may be unchanged when the TLV is not included.

In some examples, when a router receives a PIM join message on different downstream interfaces, it may honor flow attribute value for each. For example, a downstream neighbor N1 may send a flow attribute value of E1 for a join request indicating (S1, G1) and a join request indicating (S1, G2). Then, in this example, a downstream neighbor may send a flow attribute value of E2 for the join request indicating (S1,G1) and the join request indicating (S1,G3). Then, this router may send the join requests indicating (S1, G1), (S1, G2), and (S1,G3) with the same flow attribute value when it sends its PIM join message upstream. In some cases, it may be beneficial to have the different egress routers group the same set of join requests in the same flow bucket. That is, techniques used herein may not be limited to only flows that have the same destination/egress router, but can be used for flows that have different egress routers but a common source and access to some common intermediate routers.

The architecture of network device 250 illustrated in FIG. 2 is shown for exemplary purposes only and should not be limited to this architecture. In other examples, network device 250 may be configured in a variety of ways. In one example, some of the functionally of control unit 254 may be distributed within IFCs 260. Control unit 254 may be implemented solely in software, or hardware, or may be implemented as a combination of software, hardware, or firmware. For example, control unit 254 may include one or more processors which execute software instructions. In that case, the various software modules of control unit 254 may comprise executable instructions stored on a computer-readable medium, such as computer memory or hard disk.

Figure 3:
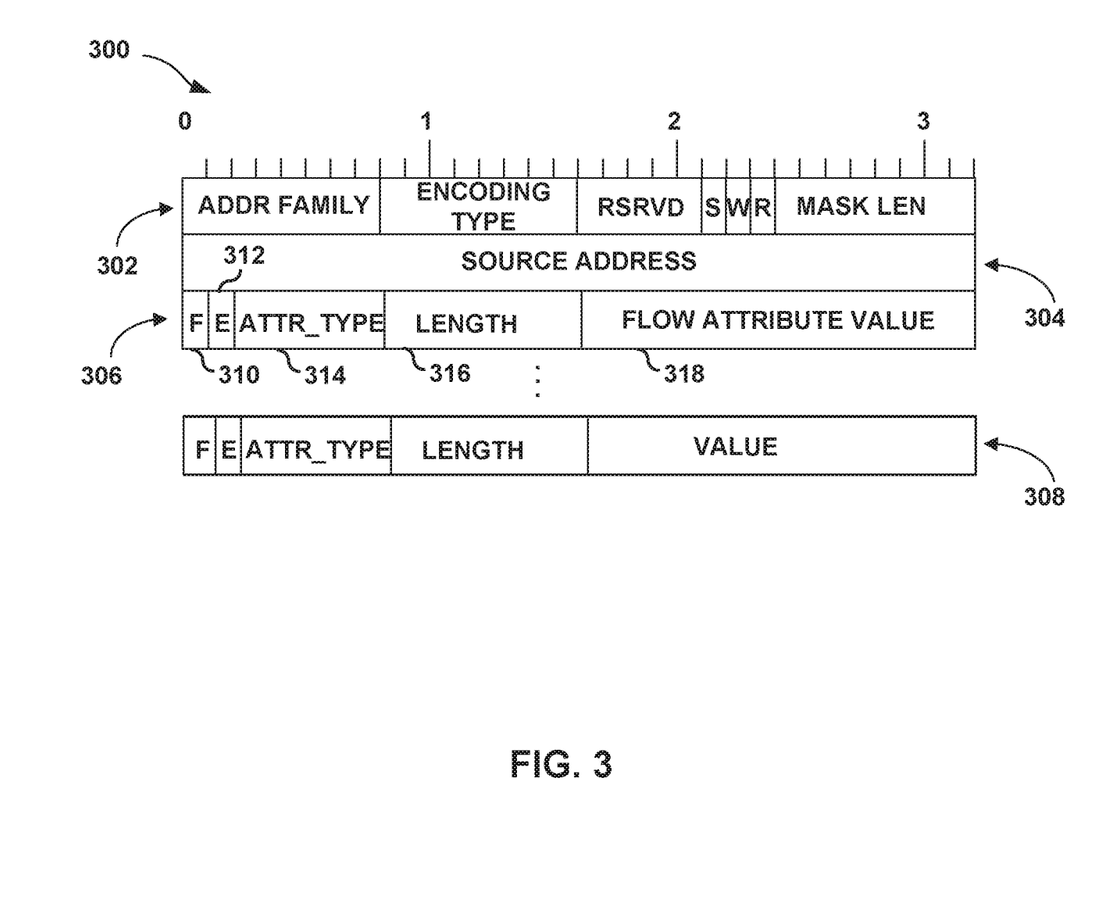
FIG. 3 is a block diagram illustrating an example flow attribute value that signals a grouping of related flows, in accordance with techniques of this disclosure.

FIG. 3 is a block diagram illustrating an example flow attribute value 318 that signals a grouping of related flows. The packet format of PIM join packet 300 illustrated in FIG. 3 is merely one example format. In other examples, different packet formats may be used for signaling a grouping of flows.

As shown in FIG. 3, a PIM join packet 300 may include an encoded-unicast address 302, a source address 304, and PIM join attribute 306. As shown, PIM join packet 300 may optionally include one or more attributes 308. Additional information the encoded-unicast address 302 may be found in Fenner, B., et al., "Protocol Independent Multicast-Sparse Mode (PIM-SM): Protocol Specification (Revised)," RFC 4601, 2006, the contents of which are incorporated herein by reference.

PIM join attribute 306 may include an 'F' bit 310, and 'E' bit 312, Attribute type ('ATTR_TYPE') 314, length 316, and flow attribute value 318. 'F' bit 310 may be a '0' non-transitive attribute. 'E' bit 312 may be a specified by "Multipath Issues in Unicast and Multicast Next-Hop Selection," RFC 2991, IETF Internet-Draft, Network Working Group, November 2000 (hereinafter referred to as "draft-Thaler,"), the contents of which are incorporated herein by reference. The attribute type 314 may indicate that PIM join attribute 306 indicates flow attribute value 318. Length 316 specifies the length in octets of flow attribute value 318. For example, length 316 may be equal to two to specify that flow attribute value 318 has a length of two octets. In this example, flow attribute value 318 may have a value range of 0-65535.

Figure 4:
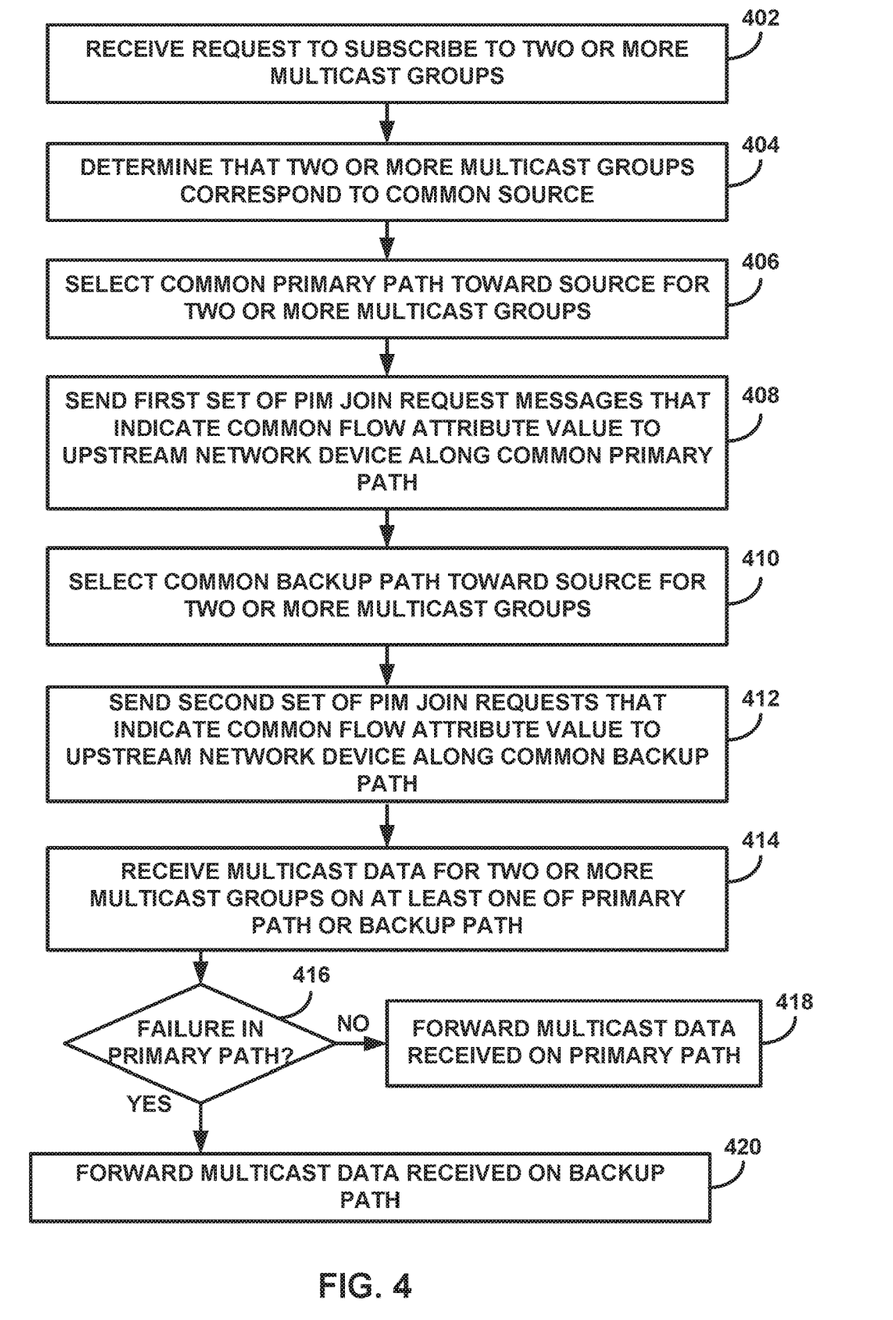
FIG. 4 is a flowchart illustrating an example operation of a network device configured to group related flows using a flow attribute value, in accordance with techniques of this disclosure.

FIG. 4 is a flowchart illustrating an example operation of a network device configured to group related flows using a flow attribute value. The example process illustrated in FIG. 4 is described with respect to network 110 of FIGS. 1A-1C, network device 250 of FIG. 2, and PIM join packet 300 of FIG. 3 for exemplary purposes only.

Router 101 receives a request to subscribe to two or more multicast groups (402). For example, router 101 receives a request from receiver 112 to subscribe to multicast groups G1-G20. Router 101 determines that the two or more multicast groups correspond to a common source (404). For example, router 101 determines that multicast groups G1-G20 are output to network 110 by source 114.

Router 101 selects a common primary path toward the source for the two or more multicast groups (406). For example, router 101 selects primary path 124 toward source 114 for multicast groups G1-G20. Router 101 sends a first set of PIM join request messages that indicate the common flow attribute value to an upstream network device along the common primary path (408). For example, router 101 sends a first set of PIM join request messages that indicate the common flow attribute value to router 102 along common primary path 124.

Similarly, router 101 selects a common backup path toward the source for the two or more multicast groups (410). For example, router 101 selects backup path 126 toward source 114 for multicast groups G1-G20. Router 101 sends a second set of PIM join request messages that indicate the common flow attribute value to an upstream network device along the common primary path (412). For example, router 101 sends a second set of PIM join request messages that indicate the common flow attribute value to router 103 along backup path 126.

Router 101 receives multicast data for the two or more multicast groups on at least one of the primary path or the backup path (414). For example, Router 101 receives multicast data for the two or more multicast groups on at least one of primary path 124 and/or backup path 126. Router 101 determines whether a failure has occurred on the primary path (416). For example, router 101 determines whether a failure has occurred on primary path 124 using a cumulative network traffic flow rate of network traffic for all of the multicast groups G1-G20 over primary path 124. In some examples, router 101 determines whether a failure has occurred on primary path 124 using a MDI for all of the multicast groups G1-G20 over primary path 124.

In response to determining that a failure has not occurred on the primary path ("NO" of 416), router 101 forwards multicast data received on the primary path (418). For example, router 101 forwards multicast data received on primary path 124 to receiver 112. In response, however, to determining that a failure has occurred on the primary path ("YES" of 416), router 101 forwards multicast data received on the backup path (420). For example, router 101 forwards multicast data received on backup path 126 to receiver 112.

Figure 5:
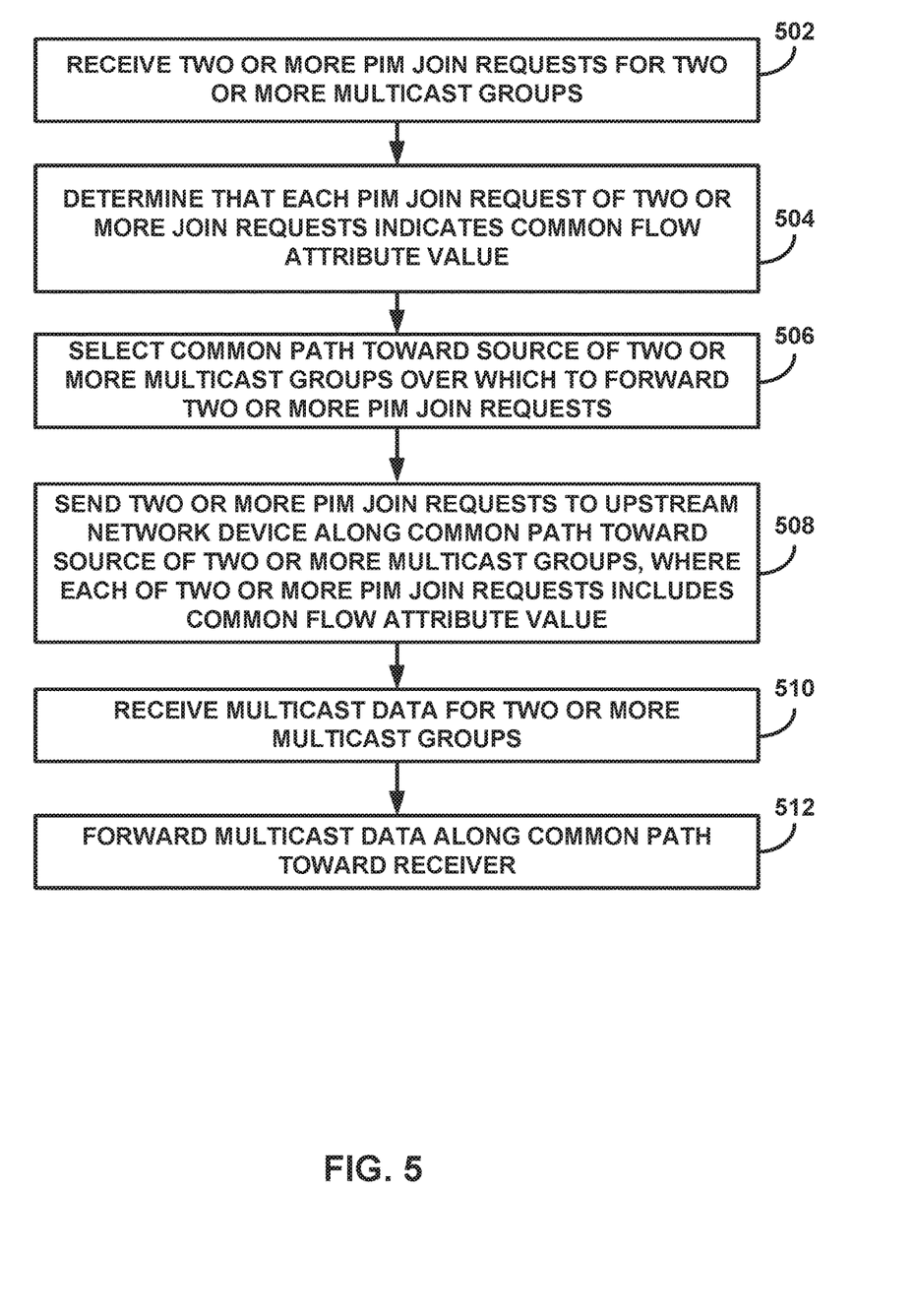
FIG. 5 is a flowchart illustrating an example operation of a network device configured to select a common path for a grouping of related flows using a flow attribute value, in accordance with techniques of this disclosure.

FIG. 5 is a flowchart illustrating an example operation of a network device configured to select a common path for a group related flows using a flow attribute value. The example process illustrated in FIG. 5 is described with respect to network 110 of FIGS. 1N-1C, network device 250 of FIG. 2, and PIM join packet 300 of FIG. 3 for exemplary purposes only.

Router 102 receives two or more PIM join request for two or more multicast groups (502). For example, router 102 receives PIM join request for multicast groups G1-G20. Router 102 determines that each PIM join request of the two or more join requests indicates a common flow attribute value (504). For example, router 102 may determine that each PIM join request for multicast groups G1-G20 indicates the common flow attribute value in response to extracting, for each PIM join request for multicast groups G1-G20, the common flow attribute value from a PIM join attribute of a respective PIM join request for multicast groups G1-G20.

Router 102 selects a common path toward a source of the two or more multicast groups over which to forward the two or more PIM join request (506). For example, router 102 selects a next-hop router as router 104 for all of multicast groups G1-G20 as shown in FIG. 1C. Router 102 sends the two or more PIM join requests to an upstream network device along the common path and toward the source of the two or more multicast groups, where each of two or more PIM join requests includes the common flow attribute value (508). For example, router 102 sends PIM join requests for all of multicast groups G1-G20 to router 104 along primary path 124 and toward source 114, where each PIM join requests for all of multicast groups G1-G20 includes the common flow attribute value that was indicated by each of the receives PIM join request for multicast groups G1-G20. In some examples, router 102 sends PIM join requests for all of multicast groups G1-G20 to router 104 along primary path 124 and toward source 114, where each PIM join requests for all of multicast groups G1-G20 includes a different common flow attribute value than the common flow attribute value that was indicated by each of the receives PIM join request for multicast groups G1-G20. In any case, router 102 receives multicast data for the two or more multicast groups (510) and forwards the multicast data along the common path and toward the receiver (512). For example, router 102 receives multicast data for the two or more multicast groups from router 104 and forwards the multicast data along primary path 124 toward receiver 112.

Various examples of the invention have been described. These and other examples are within the scope of the following claims.

What is claimed is:

1. A method comprising:
   receiving, by a network device and from a downstream network device, two or more first protocol independent multicast (PIM) join requests indicating two or more multicast groups;
   in response to determining that each first PIM join request of the two or more first PIM join requests indicates a common first flow attribute value, selecting, by the network device, a common path toward a source of the two or more multicast groups; and
   sending, by the network device, two or more second PIM join requests indicating the two or more multicast groups to an upstream network device along the common path and toward the source, wherein each second PIM join request of the two or more second PIM join requests includes a common second flow attribute value.

2. The method of claim 1, further comprising:
   extracting, by the network device, the common first flow attribute value from each first PIM join request of the two or more first PIM join requests; and
   generating, by the network device, the two or more second PIM join requests such that the common second flow attribute value included in each second PIM join request of the two or more second PIM join requests corresponds to the common first flow attribute value extracted from each first PIM join request of the two or more first PIM join requests.

3. The method of claim 1, further comprising:
   extracting, by the network device, the common first flow attribute value from each first PIM join request of the two or more first PIM join requests; and
   generating, by the network device, the two or more second PIM join requests such that the common second flow attribute value included in each second PIM join request of the two or more second PIM join requests is different than the common first flow attribute value extracted from each first PIM join request of the two or more first PIM join requests.

4. The method of claim 1,
   wherein determining that each first PIM join request of the two or more first PIM join requests indicates the common first flow attribute value comprises extracting, for each first PIM join request of the two or more first PIM join requests, the common first flow attribute value from a PIM join attribute of a respective first PIM join request of the two or more first PIM join requests; and
   wherein sending the two or more second PIM join requests comprises generating each second PIM join request of the two or more second PIM join requests to include a respective PIM join attribute indicating the common second flow attribute value.

5. The method of claim 1, wherein selecting the common path comprises selecting one of a plurality of equal-cost multi-path (ECMP) links between the network device and the source of the two or more multicast groups.

6. A network device comprising one or more processors, the one or more processors being configured to:
   receive, from a downstream network device, two or more first protocol independent multicast (PIM) join requests indicating two or more multicast groups;
   in response to determining that each first PIM join request of the two or more first PIM join requests indicates a common first flow attribute value, select a common path toward a source of the two or more multicast groups; and
   send two or more second PIM join requests indicating the two or more multicast groups to an upstream network device along the common path and toward the source, wherein each second PIM join request of the two or more second PIM join requests includes a common second flow attribute value.

7. The network device of claim 6, wherein the one or more processors are further configured to:
   extract the common first flow attribute value from each first PIM join request of the two or more first PIM join requests; and
   generate the two or more second PIM join requests such that the common second flow attribute value included in each second PIM join request of the two or more second PIM join requests corresponds to the common first flow attribute value extracted from each first PIM join request of the two or more first PIM join requests.

8. The network device of claim 6, wherein the one or more processors are further configured to:
   extract the common first flow attribute value from each first PIM join request of the two or more first PIM join requests; and
   generate the two or more second PIM join requests such that the common second flow attribute value included in each second PIM join request of the two or more second PIM join requests is different than the common first flow attribute value extracted from each first PIM join request of the two or more first PIM join requests.

9. The network device of claim 6,
   wherein, to determine that each first PIM join request of the two or more first PIM join requests indicates the common first flow attribute value, the one or more processors are further configured to extract, for each first PIM join request of the two or more first PIM join requests, the common first flow attribute value from a PIM join attribute of a respective first PIM join request of the two or more first PIM join requests; and
   wherein, to send the two or more second PIM join requests, the one or more processors are further configured to generate each second PIM join request of the two or more second PIM join requests to include a respective PIM join attribute indicating the common second flow attribute value.

10. The network device of claim 6, wherein, to select the common path, the one or more processors are further configured to select one of a plurality of equal-cost multi-path (ECMP) links between the network device and the source of the two or more multicast groups.

11. A method comprising:
    receiving, by a network device and from one or more receivers, a request to subscribe to two or more multicast groups;
    in response to determining that each multicast group of the two or more multicast groups corresponds to a common source, generating, by the network device, a common flow attribute value; and sending, by the network device, two or more protocol independent multicast (PIM) join requests indicating the two or more multicast groups to an upstream network device along a common path toward the common source, wherein each PIM join request of the two or more PIM join requests includes the common flow attribute value.

12. The method of claim 11, further comprising:

determining, by the network device, a plurality of multicast groups that correspond to the common flow attribute value, wherein the plurality of multicast groups includes the two or more multicast groups; and monitoring, by the network device, network traffic for the plurality of multicast groups to detect failure on the common path for the plurality of multicast groups.

13. The method of claim 12, further comprising:

determining, by the network device, that failure has occurred on the common path for all of the plurality of multicast groups when failure occurs on the common path for network traffic for any multicast group of the plurality of multicast groups.

14. The method of claim 11, wherein the network device is configured with multicast only fast re-route (MoFRR), wherein the common flow attribute value is a common first flow attribute value, wherein the common path is a common primary path, and wherein the two or more PIM join requests are two or more first PIM join requests, the method further comprising:

sending, by the network device, two or more second PIM join requests to an upstream network device toward the source and along a common backup path, wherein the upstream network device toward the source and along the primary path is different from the upstream network device toward the source and along the common backup path and wherein each second PIM join request of the two or more second PIM join requests includes a common second flow attribute value.

15. The method of claim 14, further comprising:

forwarding, by the network device and to the one or more receivers, multicast data received along the common primary path in response to determining that a cumulative network traffic flow rate of network traffic for all of the two or more multicast groups over the common primary path satisfies one or more threshold values; and forwarding, by the network device, to the one or more receivers, multicast data received along the common backup path in response to determining that the cumulative network traffic flow rate of network traffic for all of the two or more multicast groups over the common primary path does not satisfy the one or more threshold values.

16. The method of claim 14, further comprising:

forwarding, by the network device, to the one or more receivers, multicast data received along the common primary path in response to determining that a media delivery index (MDI) for all of the two or more multicast groups over the common primary path satisfies one or more threshold values; and forwarding, by the network device, to the one or more receivers, multicast data received along the common backup path in response to determining that the MDI for all of the two or more multicast groups over the common primary path does not satisfy the one or more threshold values.

17. A network device comprising one or more processors, the one or more processors being configured to:

receive, from one or more receivers, a request to subscribe to two or more multicast groups;

in response to determining that each multicast group of the two or more multicast groups corresponds to a common source, generate a common flow attribute value; and send two or more protocol independent multicast (PIM) join requests indicating the two or more multicast groups to an upstream network device along a common path toward the common source, wherein each PIM join request of the two or more PIM join requests includes a common flow attribute value.

18. The network device of claim 17, wherein the one or more processors are further configured to:

determine a plurality of multicast groups that correspond to the common flow attribute value, wherein the plurality of multicast groups includes the two or more multicast groups; and monitor network traffic for the plurality of multicast groups to detect failure on the common path for the plurality of multicast groups.

19. The network device of claim 18, wherein the one or more processors are further configured to:

determine that failure has occurred on the common path for all of the plurality of multicast groups when failure occurs on the common path for network traffic for any multicast group of the plurality of multicast groups.

20. The network device of claim 17, wherein the one or more processors are configured with multicast only fast re-route (MoFRR), wherein the common flow attribute value is a common first flow attribute value, wherein the common path is a common primary path, wherein the two or more PIM join requests are two or more first PIM join requests, and wherein the one or more processors are further configured to:

send two or more second PIM join requests to an upstream network device toward the source and along a common backup path, wherein the upstream network device toward the source and along the primary path is different from the upstream network device toward the source and along the common backup path and wherein each second PIM join request of the two or more second PIM join requests includes a common second flow attribute value.

21. The network device of claim 20, wherein the one or more processors are further configured to:

forward, to the one or more receivers, multicast data received along the common primary path in response to determining that a cumulative network traffic flow rate of network traffic for all of the two or more multicast groups over the common primary path satisfies one or more threshold values; and forward, to the one or more receivers, multicast data received along the common backup path in response to determining that the cumulative network traffic flow rate of network traffic for all of the two or more multicast groups over the common primary path does not satisfy the one or more threshold values.

22. The network device of claim 20, wherein the one or more processors are further configured to:

forward, to the one or more receivers, multicast data received along the common primary path in response to determining that a media delivery index (MDI) for all of the two or more multicast groups over the common primary path satisfies one or more threshold values; and forward, to the one or more receivers, multicast data received along the common backup path in response to determining that the MDI for all of the two or more multicast groups over the common primary path does not satisfy the one or more threshold values.

* * * * *